June 28, 1966  I. GOODBAR  3,258,590

PLATES FOR LIGHT CONTROL

Filed May 23, 1963  6 Sheets-Sheet 1

Isaac Goodbar
INVENTOR.

June 28, 1966  I. GOODBAR  3,258,590
PLATES FOR LIGHT CONTROL
Filed May 23, 1963  6 Sheets-Sheet 2

*Isaac Goodbar*
INVENTOR.

Isaac Goodbar
INVENTOR.

June 28, 1966        I. GOODBAR        3,258,590

PLATES FOR LIGHT CONTROL

Filed May 23, 1963        6 Sheets-Sheet 5

Isaac Goodbar
INVENTOR.

FIG.12

United States Patent Office 3,258,590
Patented June 28, 1966

3,258,590
PLATES FOR LIGHT CONTROL
Isaac Goodbar, 93—02 211th St., Queens Village, N.Y.
Filed May 23, 1963, Ser. No. 282,693
5 Claims. (Cl. 240—106)

The present invention relates to light refracting and transmitting plates applicable for light control in lighting fixtures and in other optical devices.

The plates made in accordance with the present invention will transmit the light received from certain specific regions in space into other specific regions only, as will be described.

When applied to lighting fixtures they will make possible the elimination or great reduction of direct or reflected glare, or both, as will be explained.

The light control by means of the present invention is obtained by redirecting the light into the desired zones by refraction or total reflection and never by obstruction or absorption of light. This means that high efficiency is obtained.

Still further objects and advantages of the present invention will be recognized during a reading of the following description in conjunction with the accompanying drawings wherein.

As will be seen from a further reading of this description the foregoing figures are merely diagrammatic illustrations of examples of designs in accordance with the present invention. The invention is by no means restricted to such examples or light sources. Any other light source can be accommodated by following the teachings of this specification.

Figure 1:
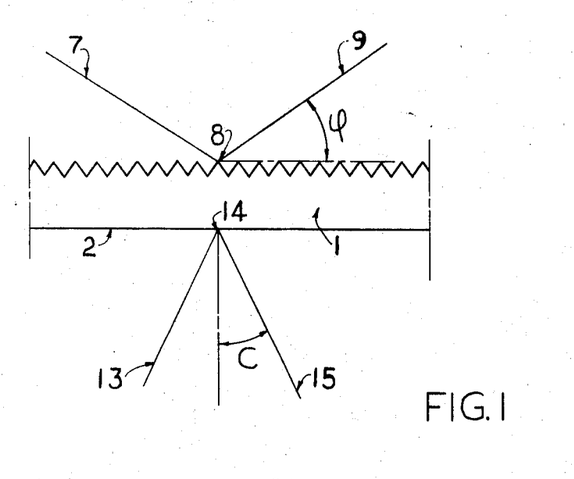
FIG. 1 is a diagrammatic vertical cross-sectional view through a plate built in accordance with the present invention showing the zones from which the light may be allowed to reach the upper part and the zones into which such light would be emitted by the lower part.
Figure 2:
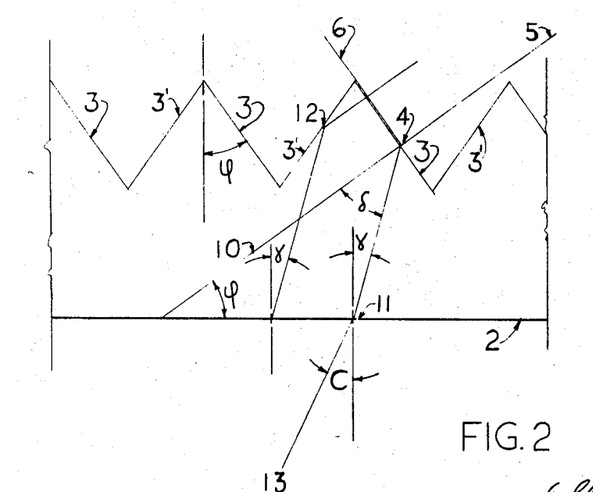
FIG. 2 is a large scale diagrammatic section of FIG. 1.

Referring now to FIGURES 1 and 2 it is possible to see that the plates 1 object of the present invention, in the example shown in these figures, have one side 2 flat and the other limited by planes perpendicular to the figures and inclined at an angle $\varphi$, off the vertical given in radians by the following formula:

$$\varphi = \frac{\pi}{4} - \frac{1}{4} \operatorname{cosec}^{-1} n \tag{1}$$

where $$\pi \cong 3.1416$$

and $n$ is the index of refraction of the transparent material of which 1 is made and which for the purpose of the present invention must always be larger than 1.155.

The light is assumed to come, at each point, only from above two planes inclined at the same angle $\varphi$ off the horizontal i.e. from dihedrons such as the one intercepting the plane of FIG. 1 in 7–8–9.

As it will be demonstrated the light will be emitted only outside the dihedron 13–14–15 formed by planes perpendicular to FIG. 1 and inclined at an agle $c$ off the vertical, where $c$ is given by the following formula:

$$c = \sin^{-1} n \sin\left(\frac{\pi}{4} - \frac{3}{4}\delta\right) \tag{2}$$

where $$\delta = \operatorname{cosec}^{-1} n \tag{3}$$

On any point 4 located anywhere on the limiting planes 3 (FIG. 2) the light would be coming from the dihedron 6–4–5, in which 6–4 is perpendicular to 4–5. For this reason 6–4–5 will be a quarter of a sphere with center at the point 4 considered.

The light coming from such quarter spheres will be refracted, when crossing the limiting surface 3 into a half cone intersecting the plane of FIG. 2 at 10–4–11. The ray 5–4 perpendicular to 3 will cross that surface without experiencing any change in direction. The grazing rays 6 (parallel to 3) will be refracted into a cone 4–11 at the critical angle $$\delta = \operatorname{cosec}^{-1} n \tag{3}$$

Immediately after crossing the surface 3, therefore, all the light rays will be contained in planes forming an angle, with the horizontal, never smaller than $\varphi$ and never larger than $\varphi + \delta$.

Replacing the value of $\varphi$ from (1) and (3) this means that no light reaching directly the surface 2 can be in a plane perpendicular to FIG. 2 forming with such surface 2 an angle larger than $$\delta + \varphi = \delta + \frac{\pi}{4} - \frac{\delta}{4} = \frac{3}{4}\delta + \frac{\pi}{4} \tag{4}$$

Part of this light will reach the horizontal face 2 and part will reach the opposite inclined plane 3'.

The light rays reaching this side 3' must be inclined at angle between $\varphi$ (the highest possible entering) and $(\pi/2 - \varphi)$ parallel to 3'.

They will form with the normal to the plane 3', therefore, angles between a maximum of $\pi/2$ and a minimum of $2\varphi$.

In accordance with (1) and (3)

$$2\varphi = \frac{\pi}{2} - \frac{\delta}{2} \tag{5}$$

but $$\delta < \pi/3$$

because $$n \geqslant 1.155$$

therefore:

$$2\varphi = \frac{\pi}{2} - \frac{\delta}{2} \geqslant \frac{\pi}{3} > \delta \tag{6}$$

and therefore all the light reaching the side 3' from the side 3 must be totally reflected.

After such total reflection all this light will be fully contained within planes forming with the horizontal, angles no smaller than $(\pi/2-\varphi)$ and no larger than $\pi-\varphi 3$.

Replacing the value of $\varphi$ from (1) and (2) this means that no light entering 3 and totally reflected at 3' can reach 2 in a plane perpendicular to FIG. 2 forming with 2 an angle larger than:

$$\pi-3\varphi=\pi-\frac{3}{4}\pi+\frac{3}{4}\delta=\frac{3}{4}\delta+\frac{\pi}{4} \qquad (7)$$

No light direct or reflected, therefore can reach 2 in a plane perpendicular to FIG. 2 at an angle larger than the one given by (4) or (7).

If angles are measured from the vertical plane perpendicular to FIG. 2 it can be stated, in accordance with (4) and (7) that no light can reach, either directly after refraction, or after refraction and one reflection, the surface 2 from inside the two planes perpendicular to FIG. 2 and forming an angle:

$$\gamma=\frac{\pi}{4}-\frac{3}{4}\delta \qquad (8)$$

with the vertical.

The light that reaches 2 at an angle larger than the critical angle $\delta$ is totally reflected upwards and most of it exits up through 3' back into the environment on top of the plate, where it came from. Part of it is readmitted through the other side 3.

The light that does not exit through 3' is reflected by it mainly against 3, down into 2, up again, etc. A complete analysis of the complicated trajectories that actually take place in space shows that no appreciable amount of light reaches the surface 2, from above, from inside the above-mentioned dihedron formed by two planes perpendicular to FIG. 2 and inclined at an angle $\gamma$, as given by (8), off the vertical.

The fact that practically all the light that reaches 2 from above is contained outside the dihedron mentioned does not make it obvious that such light will emerge outside a dihedron formed by two planes perpendicular to FIG. 2 and inclined at an angle $c$ (given by (2)) off the vertical.

It is true that a ray such as 4–11, contained in the plane of FIG. 2 and inclined at angle $\gamma$ will, in accordance with Snell's law, obviously emerge at an angle $c$ but it is not obvious that all the other rays contained in the plane perpendicular to the figure and cutting it along 4–11 will emerge to the left of plane 11–13.

To prove that this is what in fact happens reference will be made to FIG. 3.

In this figure a sphere of center O is represented. Each point of this spherical surface will represent when joined to the center, the direction of a ray of light.

Figure 3:
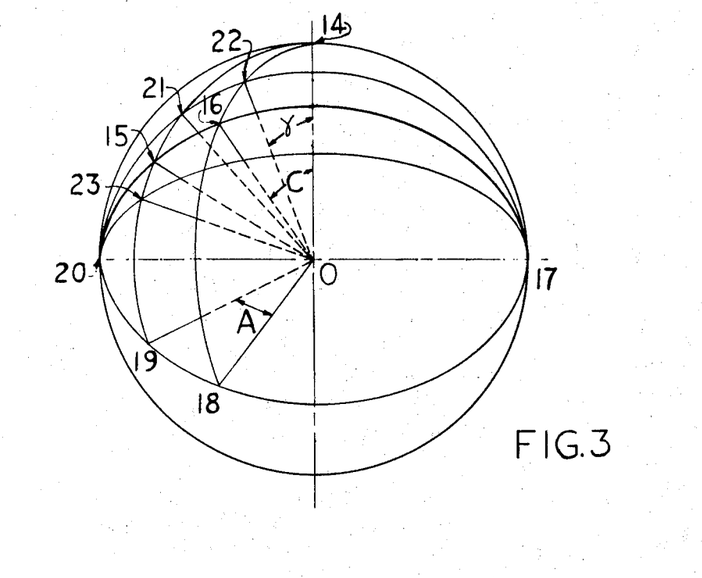
FIG. 3 is a diagram to facilitate the demonstration of the device object of the present invention.

The plane of FIG. 2 is represented in FIG. 3 by 14–O–18; any other vertical plane such as 14–O–19 will form an angle A with it.

The ray 4–11 contained in FIG. 2 is represented by point 22 of FIG. 3, this means that:

$$\text{Angle } 22\text{–}O\text{–}14=\gamma \qquad (9)$$

$$\text{Angle } 16\text{–}O\text{–}14=\sin^{-1}n\left(\frac{\pi}{4}-\frac{3}{4}\delta\right)=C \qquad (10)$$

Thus if 22–O represents the direction of a ray reaching surface 2 from above, 16–O represents the direction of emergence of that ray below.

Any other ray contained in the plane 20–22–17 such as 21–O must emerge, in accordance with the laws of refraction, in a plane containing the incident ray 21–O and the normal to the surface 2, which in FIGURE 3 is 14–O.

Therefore, the emerging ray must be contained in the plane 19–21–14 and it is not immediately obvious whether it will be below or above 15, which is the intersection of plane 19–21–14 and plane 20–16–17 (perpendicular to the plane of FIG. 2 and containing 11–13).

Considering the right spherical triangle 14–22–21 it is possible to express the side 21–14 as a function of the side 22–14 which is equal to $\gamma$, and of the angle 21–14–22, which is equal to A (FIG. 3).

The following formula is obtained:

$$\sin(21-14)=\frac{\sin\gamma}{\sqrt{1-\cos^2\gamma\sin^2 A}} \qquad (11)$$

Similarly, in the right spherical triangle 15–16–14, it is possible to express 14–15 as a function of 15–14–16, which is equal to A and of 14–16, equal to $c$:

$$\sin(14-15)=\frac{\sin C}{\sqrt{1-\cos^2 C\sin^2 A}} \qquad (12)$$

Dividing (12) by (11):

$$\frac{\sin(14-15)}{\sin(21-14)}=\frac{\sin C}{\sin\gamma}\sqrt{\frac{1-\cos^2\gamma\sin^2 A}{1-\cos^2 C\sin^2 A}} \qquad (13)$$

But, in accordance with Snell's law:

$$\frac{\sin C}{\sin\gamma}=n \qquad (14)$$

Also it is possible to make:

$$r=\sqrt{\frac{1-\cos^2\gamma\sin^2 A}{1-\cos^2 C\sin^2 A}} \qquad (15)$$

But, since the index of refraction of the plate is larger than unity:

$$c>\gamma \qquad (16)$$

from which:

$$\cos C<\cos\gamma$$
$$\cos^2 C\sin^2 A<\cos^2\gamma\sin^2 A$$
$$1-\cos^2 C\sin^2 A>1-\cos^2\gamma\sin^2 A \qquad (17)$$
$$r<1$$

replacing (14) and (15) in (13):

$$\frac{\sin(14-15)}{\sin(14-21)}=rn \qquad (18)$$

But the ray 21–O, in accordance to Snell's law must emerge in a direction such as 23–O contained in the plane 14–O–19 and at an angle 14–23 such that $$\frac{\sin(14-23)}{\sin(14-21)}=n \qquad (19)$$

dividing (18) by (19)

$$\frac{\sin(14-15)}{\sin(14-23)}=r \qquad (20)$$

from (17):

$$\sin(14-15)<\sin(14-23) \qquad (21)$$

and, therefore:

$$\text{angle }(14-15)<\text{angle }(14-23) \qquad (23)$$

Which proves that emerging rays, such as O–23, always fall outside the dihedron considered.

Therefore, a plate constructed as explained, i.e., with prisms formed by planes inclined at an angle $\varphi$ (as given by (1)) on top, and a plane surface at the bottom, receiving light only within the dihedron described will emit light from its lower surface only outside a dihedron formed by two planes inclined at an angle $c$ (as given by (2)) off the vertical. It is important to note that this result is obtained thanks to the inclination of faces 3 and 3' at the angle $\varphi$ as given by Formula 1. If this inclination $\varphi$ is made different, the result will not be as good.

Let it be $$\varphi=\frac{\pi}{4}-\frac{1}{4}\operatorname{cosec}^{-1}n+\epsilon \qquad (24)$$

where $\epsilon$ is any small or large positive or negative value by which $\varphi$ differs from the value given by (1), replacing (3) in (24):

$$\varphi = \frac{\pi}{4} - \frac{\delta}{4} + \epsilon \qquad (25)$$

replacing in (4):

$$\delta + \varphi = \frac{3}{4}\delta + \frac{\pi}{4} + \epsilon \qquad (26)$$

Replacing (25) in (7)

$$\pi - 3\varphi = \pi - \frac{3}{4}\pi + \frac{3}{4}\delta - 3\epsilon = \frac{\pi}{4} + \frac{3}{4}\delta - 3\epsilon \qquad (27)$$

(26) gives the maximum angle of a plane containing light received directly by surface 2 and (27) the maximum angle of a plane containing light reaching 2 after a reflection on 3'.

If $\epsilon$ happens to be positive, therefore, there will be light reaching 2 directly in planes at angles larger than the value given by (4) or (7). If $\epsilon$ happens to be negative there will be reflected light reaching 2 in a plane at a higher angle than the one given by (4) or (7). In either case the value of $\gamma$ will be smaller than the one given by 8. This would, of course, make $c$ also smaller.

This all proves that the best value of $\varphi$ is the one given by Formula 1. It also shows that some departure from the value given by Formula 1 is possible while still achieving, approximately, the objects of the present invention. A positive error $\epsilon$, that is a value of $\varphi$ slightly larger than the one given by (1) is to be preferred to a negative error (a value of $\varphi$ smaller than the one given by (1)).

From (8), (26) and (27), if $\epsilon$ is positive:

$$\gamma = \frac{\pi}{4} - \frac{3}{4}\delta - \epsilon \qquad (28)$$

and if $\epsilon$ is negative $$\gamma = \frac{\pi}{4} - \frac{3}{4}\delta - 3|\epsilon| \qquad (29)$$

therefore a positive error reduces the angle $\gamma$ by a value equal to itself, a negative error reduces it three times as much.

Having thus described one type of light refracting and transmitting plate, some of its possible applications will be described only as examples and without limiting in any way the scope of this invention as defined in the appended claims.

Figure 4:
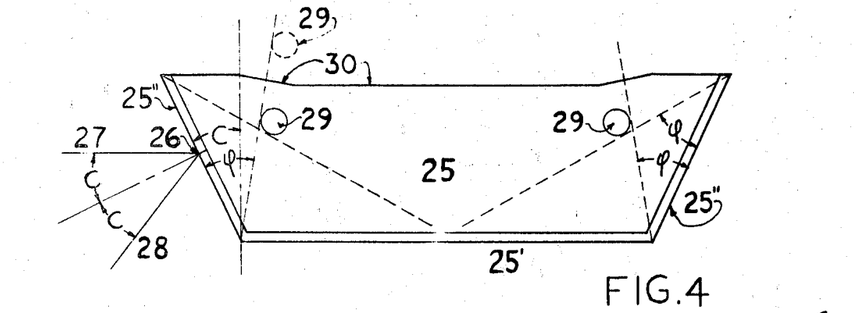
FIG. 4 is a diagrammatic section of a fluorescent lighting fixture employing the plates object of the present invention for the efficient elimination of direct glare from the sides of the luminaire.

One such application is illustrated in FIG. 4. This figure shows a cross section of a fluorescent fixture 25.

This fixture has a cover 25 of transparent plastic with one horizontal section 25' and two inclined sides 25".

The horizontal section may be built in any known way to avoid excessive brightness at high angles.

The inclined sides are panels constructed as described (FIGS. 1 and 2) with the prisms 3–3' inside.

As it can be seen on FIG. 4 all the light sources 29 and their reflected images are placed in such a way that they are always outside the dihedron formed by two planes parallel to the fluorescent tubes and at an angle $\varphi$ (as given by (1)) to the plates 25".

The plates 25" are inclined at an angle $c$, as given by (2), off the small vertical.

The light emitted by the plates 25", in accordance with the previous description in this specification, will be outside the dihedron 27–26–28 perpendicular to FIG. 4. There will be light emitted above the horizontal, which will be useful in lighting the ceiling around the fixture and there will be light emitted below the plane at an angle 2$c$ below the horizontal (2$c$=51° for $n$=1.59).

The light reaching the ceiling will be helpful in reducing the contrast between the fixture and its environment. After reflection on the ceiling this light will reach the work zone, supplementing the luminous flux reaching it directly from the fixture, below the direct glare zone. This fixture, therefore, emits all its light output in useful zones and prevents direct glare. Furthermore this is achieved without obstructing any light i.e. all the luminous flux of the lamps reaching 25" is directed into useful zones, by the plates 25" by means of refraction and total reflection only. A very high luminous efficiency with very low brightness in the direct glare zone is, thus, obtained.

Figure 5:
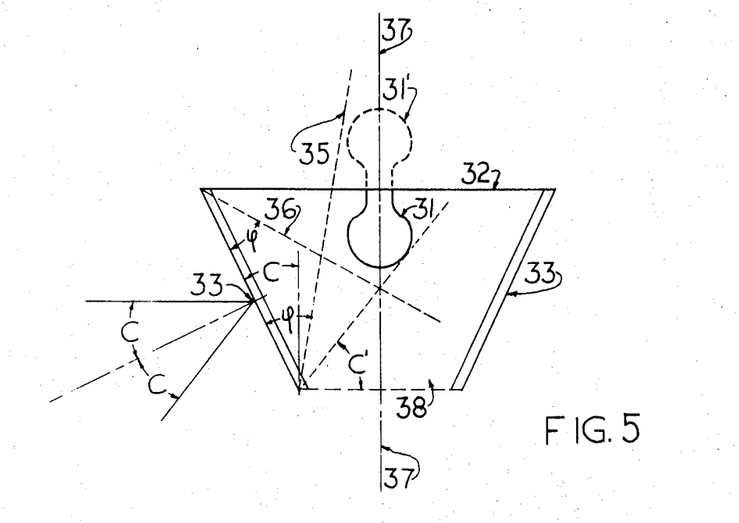
FIG. 5 is a diagrammatic section of an incandescent luminaire using the plates object of the present invention, properly curved, for the efficient elimination of direct glare.

FIG. 5 shows an application of this invention to an incandescent luminaire.

The top of this fixture, as shown in FIG. 5 is a flat mirror, which produces a virtual image 31' of the source 31.

The plate 33 is constructed as described, with prisms on its inside but is, in this case, a truncated circular cone such that the luminous sources 31 and 31' are always within the space limited by the rotation of the lines 35 and 36 (FIG. 5) around the axis of symmetry 37—37.

For the reasons explained all the light from 31 and 31' that reaches 33 will be emitted above the horizontal or below the angle 2$c$ below the horizontal. It is also possible, if the ceiling height is enough, to eliminate the top mirror and hang the fixture by means of a stem. In this form the light emitted upwards by the lamp will reach the ceiling directly.

Figure 6:
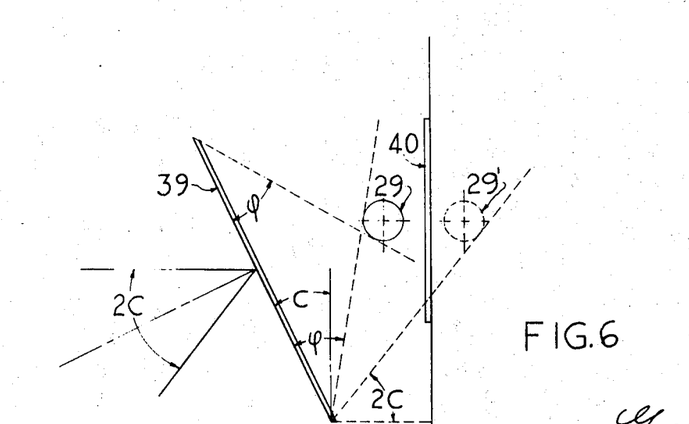
FIG. 6 is a diagrammatic section of a fluorescent luminaire to be mounted on a wall and in which the plate object of the present invention efficiently eliminates direct glare.

Another possible use of the plate object of the present invention is shown in FIG. 6. In this case the fixture is surface mounted on a wall and, as described, emits light only towards the ceiling and below an angle 2$c$ below the horizontal.

Many other applications of the plates object of the present invention for the elimination of direct glare are possible within the scope of this invention which will be made clear in the appended claims.

When the light reaches a visual task from some undesirable directions another type of glare is apparent: reflect glare.

When the task is highly specular (glossy materials) it is possible to actually see the reflected image of the source on it, thus the name "reflected glare" by which this type of glare became known.

In recent years it was proved that this effect does occur not only with glossy materials but with all existing materials (Finch, D. M., "Physical Measurements for the Determination of Brightness and Contrast," Illuminating Engineering, vol. LIV, No. 8, p. 481 (August 1959); Blackwell, H. R., Illuminating Engineering, vol. LVIII, No. 4, Section I, p. 161 (April 1963)). The angles at which people view the visual tasks have been exhaustively studied (Allphin, W., "Sight Lines to Desk Tasks in Schools and Offices," Illuminating Engineering vol. LVIII, No. 4, Section I, p. 244 (April 1963); Crouch, C. L. and Kaufman, J. E., "Practical Application of Polarization and Light Control for Reduction of Reflected Glare," Illuminating Engineering, vol. LVII, No. 4, Section I, p. 277 (April 1963)) and methods of calculation that make possible the prediction of contrast losses under different systems of luminaires, have been developed (Goodbar, I., "Point by Point Prediction of Contrast Losses," Illuminating Engineering, vol. LVIII, No. 4, Section I, p. 262 (April 1963)).

One way of decreasing these contrast losses due to veiling reflections is by avoiding light coming from inside the dihedron formed by two inclined planes containing a horizontal line passing through the task.

Figure 7:
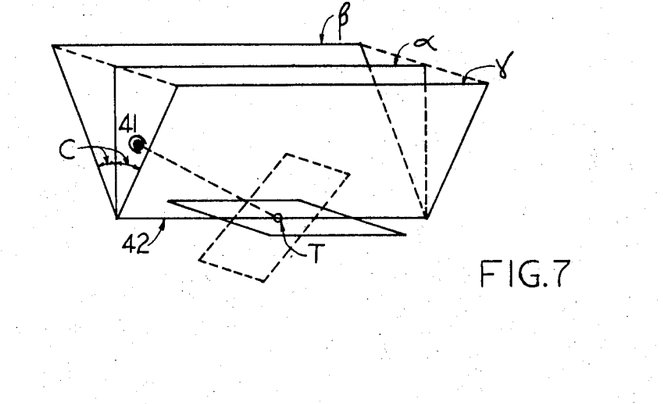
FIG. 7 is a diagram to facilitate the explanation of the reduction of reflected glare by means of the present invention.

Referring to FIG. 7, T represents the task, which may be horizontal or inclined as shown (assuming that it is a flat task), $\alpha$ is the vertical plane passing through the task T and the eye 41, 42 is a horizontal line at task level and $\beta$ and $\gamma$ are two planes containing 42 and inclined at an angle $c$ off the vertical. Calculations prove that by avoiding light from within the dihedron formed by $\beta$ and $\gamma$, the contrast on practically all tasks T improves for all viewing angles and for all inclinations of the task (as long as the plane of the task remains perpendicular to the viewing plane α, as is usually the case with flat tasks).

In cases where the orientation of the viewing plane α can be maintained parallel to a certain direction, as is often the case in offices, drafting rooms, classrooms etc. it will be possible to use the plates object of the present invention on a complete or almost complete luminous ceiling that will greatly improve the Contrast and, therefore, the visibility of the visual tasks, while, at the same time, also decreasing considerably the direct glare.

Figure 8:
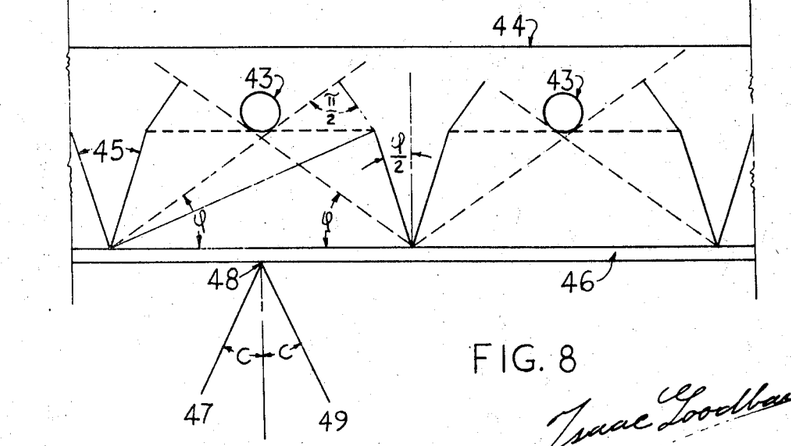
FIG. 8 represents diagrammatically a luminous ceiling in which the plates object of the present invention are used for the reduction of reflected glare.

FIG. 8 represents a cross restion of such an installation. Referring to FIG. 8: 43 are the fluorescent tubes, 44 is the white ceiling, 45 are specular louvers (they could be of curved surfaces as described in copending application of Edison Price and Isaac Goodbar, Serial No. 857,641, filed September 18, 1958) which assure that no light can reach the plates 46 in planes perpendicular to the figure and forming angles smaller than φ with 46.

As previously described the light emitted by the plates 46 downwards will avoid the dihedron 47-48-49, where 48 is any point on the lower surface of 46.

For this reason any point on a task below (except very near the walls) will receive light only from outside the planes β, γ shown in FIG. 7.

Figure 9:
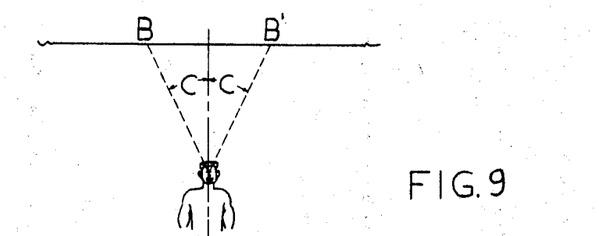
FIG. 9 represents schematically a person under a luminous ceiling such as the one of FIG. 8.
Figure 10:
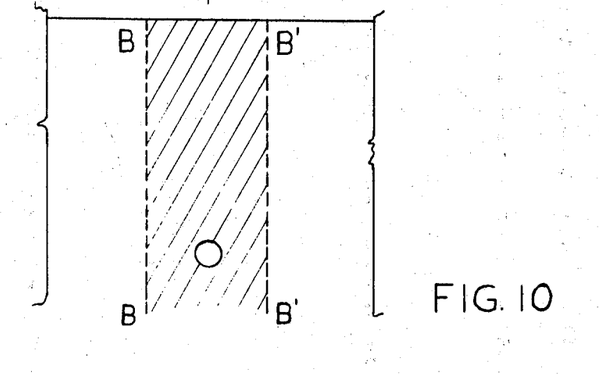
FIG. 10 is a plan view of FIG. 9.

To an observer seated or standing below, the zone BB' in front of him (FIGS. 9 and 10) appears dark at all angles, for this reason the direct glare is also considerably reduced. It is to be noted that this zone moves with the observer.

If desired, other baffles, such as 45 (or parabolic, as described in copending application of Edison Price and Isaac Goodbar, Serial No. 857,641, filed September 18, 1958, now U.S. Patent No. 3,098,612) may run perpendicularly to the fluorescent tubes to provide lengthwise shielding also. Direct glare would be, then eliminated almost completely while reflected glare would be almost eliminated for observers with viewing planes parallel to the fluorescent tubes.

The plates object of the present invention also work in reverse i.e., referring to FIG. 1, if light reaches the prisms 3 from below 7, 8, 9, it will emerge at 2 within the zone 13-14-15.

Figure 11:
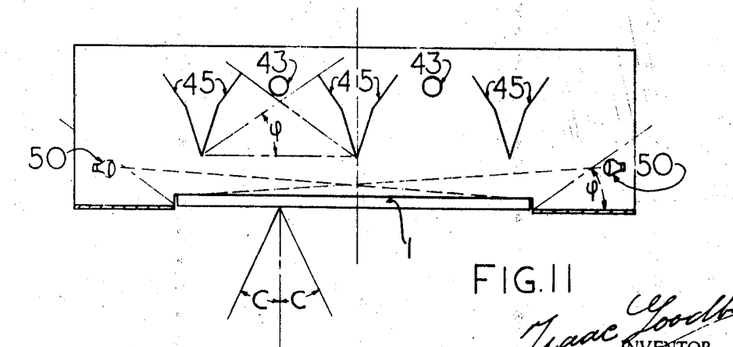
FIG. 11 shows another application of the present invention.

One possible application of this property of the plates object of the present invention is illustrated in FIG. 11 which may represent a luminous ceiling or a recessed fixture.

If only reflector or other lamps 50 are installed, as shown, all the light will reach the plate 1, with prisms on the top as described, in planes inclined less than φ off the horizontal. As explained this light will emerge within planes perpendicular to the figure and inclined at an angle c off the vertical. Direct glare would be almost eliminated.

As shown in FIG. 11 it is possible to include also fluorescent tubes 43 and specular baffles 45. Such an arrangement might be very useful in classrooms or auditoriums. Normally the lamps 43 alone would be on, providing the best possible contrast rendition, as explained, and lighting also the walls. When it becomes necessary to show slide or motion picture projections, while still allowing the students to make notes, the lamps 43 are turned off and the sources 50 are turned on. All the light is then restricted at angles near the vertical. The walls and projection screens are, therefore, kept in darkness while the desks are well lighted.

Figure 12:
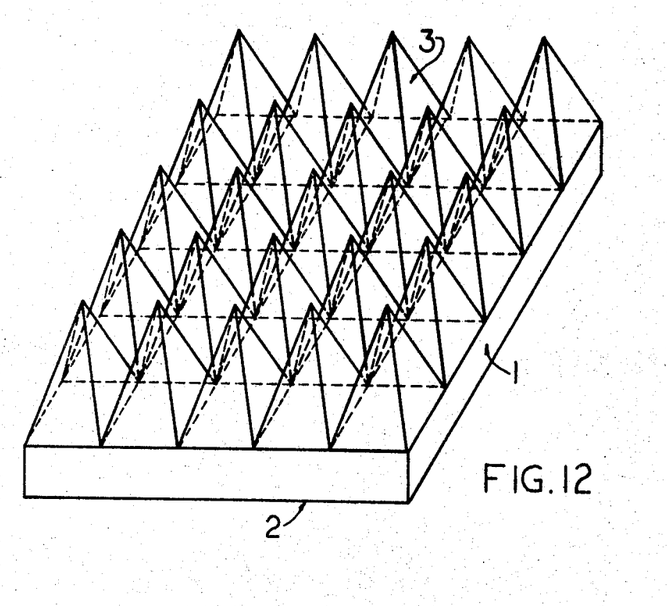
FIG. 12 shows schematically plates in accordance with the present invention in which the planes 3, 3' shown in FIGS. 1 and 2 run in two perpendicular directions.

In all the descriptions so far it was assumed that planes 3 and 3' run only in one direction (perpendicular to the figures). Very often this would be a preferred construction, however, in some cases it may be found convenient to have planes in more than one direction. FIG. 12 shows a case in which planes 3 and 3' are inclined at an angle φ off the vertical and run in two perpendicular directions, forming upright (as shown in the figure) or inverted pyramids of square base. Pyramids of any other bases (triangular, hexagonal, etc.) could be formed, or even circular cones.

Such constructions might be used in applications such as shown in FIGS. 4 and 6 when it is not necessary to limit the brightness of the fixtures when seen from the sides. This may be the case in narrow rooms or corridors.

The bottom surface 2 has been described throughout this specification as flat, it is possible however, without departing from the scope of the present invention, to make it curved or composed of alternately inclined planes, to spread the light in any desired way, as is well known in the art.

Also, even though the plates have been described as transparent they may in some cases have diffusing characteristics. This may be the case, for instance, when it is desired to soften the edges of the beams.

Many changes and combinations are possible without departing from the scope of the present invention.

Having now particularly ascertained and described the nature of the present invention and the manner in which the same is to be performed, what I claim is:

1. A refractor made of a substantially transparent material of refractive index $n$ higher than 1.155, having an emergent surface in the shape of a longitudinally extended plane and opposed thereto, a receiving surface consisting of a series of contiguous, identical transversely extending symmetrical prismatic elements with straight sides which make with the plane of the first surface an angle of substantially $$\tfrac{1}{4}\pi + \tfrac{1}{4}\operatorname{cosec}^{-1} n \text{ (radians)}$$

where $\pi$ is approximately 3.1416 and means to limit the light admitted into the abovementioned receiving surface so that all the light received at any point is contained within the obtuse dihedral angle formed by the two planes perpendicular to the abovementioned straight sides of the symmetrical prismatic elements which intersect on a line parallel to the axes of the prisms containing the point under consideration.

2. A light fixture including light sources and a refractor made of substantially transparent material of refractive index $n$ higher than 1.155, having in a longitudinally extended plane an emergent surface and opposed thereto, a receiving surface consisting of a series of contiguous, identical, transversely extending symmetrical prismatic elements with straight sides which make with the plane of the first surface an angle of substantially $$\tfrac{1}{4}\pi + \tfrac{1}{4}\operatorname{cosec}^{-1} n \text{ (radians)}$$

where $\pi$ is approximately 3.1416, the light sources only being located within the obtuse dihedral angle defined by two planes perpendicular to the abovementioned straight sides of said prismatic elements which intersect on the prismatic edge.

3. A lighting fixture comprising a horizontal substantially transparent plate for light control with thickness small in comparison with the other two dimensions, with refractive index $n$ larger than 1.155, having a lower face in the shape of a flat horizontal plane and an upper face thereof comprising a plurality of contiguous transversely extending symmetrical prismatic elements with flat sides making with the horizontal an angle of substantially $$\tfrac{1}{4}\pi + \tfrac{1}{4}\operatorname{cosec}^{-1} n \text{ (radians)}$$

where $\pi$ is approximately 3.1416, and shielding elements located above the prismatic surface having hollow interiors open at the bottom thereof to project light downwardly, light sources, means for mounting said light sources in positions located above the lower edge of said shielding elements so as to produce an light limiting angle of substantially $$\tfrac{1}{4}\pi - \tfrac{1}{4}\operatorname{cosec}^{-1} n \text{ (radians)}$$

below the horizontal in a direction perpendicular to the axes of the abovementioned symmetrical prismatic elements.

4. A light fixture including light sources, a refractor in accordance with claim 1 but curved in shape.

5. A lighting system to be installed on a ceiling, capable of providing two entirely different and complementary light distributions, one of them with most of the luminous flux concentrated near the vertical and the other with most of it coming from the sides, so as to minimize veiling reflections, characterized by comprising a horizontal substantially transparent plate for light control with thickness small in comparison with the other two dimensions, having a refractive index larger than 1.155, having a lower face in the shape of a flat horizontal plane and an upper face thereof comprising a plurality of contiguous transversely extending symmetrical prismatic elements with flat sides, making with the horizontal an angle of substantially $$\tfrac{1}{4}\pi + \tfrac{1}{4}\,\mathrm{cosec}^{-1} n \text{ (radians)}$$

where $\pi$ is approximately 3.1416, shielding elements located above said transparent plate, having hollow interiors open at the bottom thereof to project light downwardly, one group of light sources with means for mounting said light sources in a position located above the lower edge of said shielding elements so as to produce a light limiting angle of substantially $$\tfrac{1}{4}\pi - \tfrac{1}{4}\,\mathrm{cosec}^{-1} n \text{ (radians)}$$

below the horizontal in a direction perpendicular to the axes of the abovementioned symmetrical prismatic elements and another group of light sources with means for mounting them below said shielding elements so that most of their light output will reach the transparent plate at angles below the abovementioned effective shielding angle.

References Cited by the Examiner

UNITED STATES PATENTS

| | | | |
|---|---|---|---|
| 2,050,429 | 8/1936 | Dorey et al. | 240—106 |
| 2,737,577 | 3/1956 | McPhail | 240—106 X |
| 2,904,673 | 9/1959 | Guth | 240—106 X |
| 3,052,794 | 9/1962 | Kruger | 240—9 |
| 3,085,152 | 4/1963 | Schwartz et al. | 240—9 X |
| 3,154,254 | 10/1964 | McPhail et al. | 240—106 |

FOREIGN PATENTS 566,189  12/1944  Great Britain.

NORTON ANSHER, *Primary Examiner.*

EVON C. BLUNK, *Examiner.*

CHARLES C. RHODES, *Assistant Examiner.*